United States Patent [19]

Pinto

[11] 4,270,337
[45] Jun. 2, 1981

[54] HARVESTER OF SUGAR CANE OR SIMILAR PRODUCTS

[75] Inventor: Luiz A. C. D. R. Pinto, Ribeirao Preto, Brazil

[73] Assignee: Santal Equipamentos S.A. Comercio E. Industria, Brazil

[21] Appl. No.: 64,793

[22] Filed: Aug. 8, 1979

[30] Foreign Application Priority Data

Aug. 17, 1978 [BR] Brazil ............................ 7805293[U]

[51] Int. Cl.³ .......................................... A01D 45/10
[52] U.S. Cl. ................................................ 56/13.9
[58] Field of Search ............................ 56/13.6, 13.9

[56] References Cited

U.S. PATENT DOCUMENTS

| | | | |
|---|---|---|---|
| 3,673,774 | 7/1972 | Mizzi | 56/13.9 |
| 3,791,114 | 2/1974 | Fowler | 56/13.9 |
| 3,848,399 | 11/1974 | Makeham | 56/13.9 |
| 4,098,060 | 7/1978 | Quick | 56/13.9 |
| 4,170,098 | 10/1979 | Moreno et al. | 56/13.9 |

Primary Examiner—Robert A. Hafer
Attorney, Agent, or Firm—Steinberg & Raskin

[57] ABSTRACT

The invention relates to a harvester of sugar cane or similar products which provides a significant reduction of moving parts and more efficient cleaning of the harvested product than was hitherto possible. This is accomplished by replacing the individual known components for cutting, elevating and cleaning of the cane by a single rotating mechanism provided with a single shaft of reversible rotation and which is fitted with displaceable knives and fixed throwing vanes or wings, which vanes are enclosed in a cylinder with a top outlet discharging the cane billets into a movable duct.

13 Claims, 20 Drawing Figures

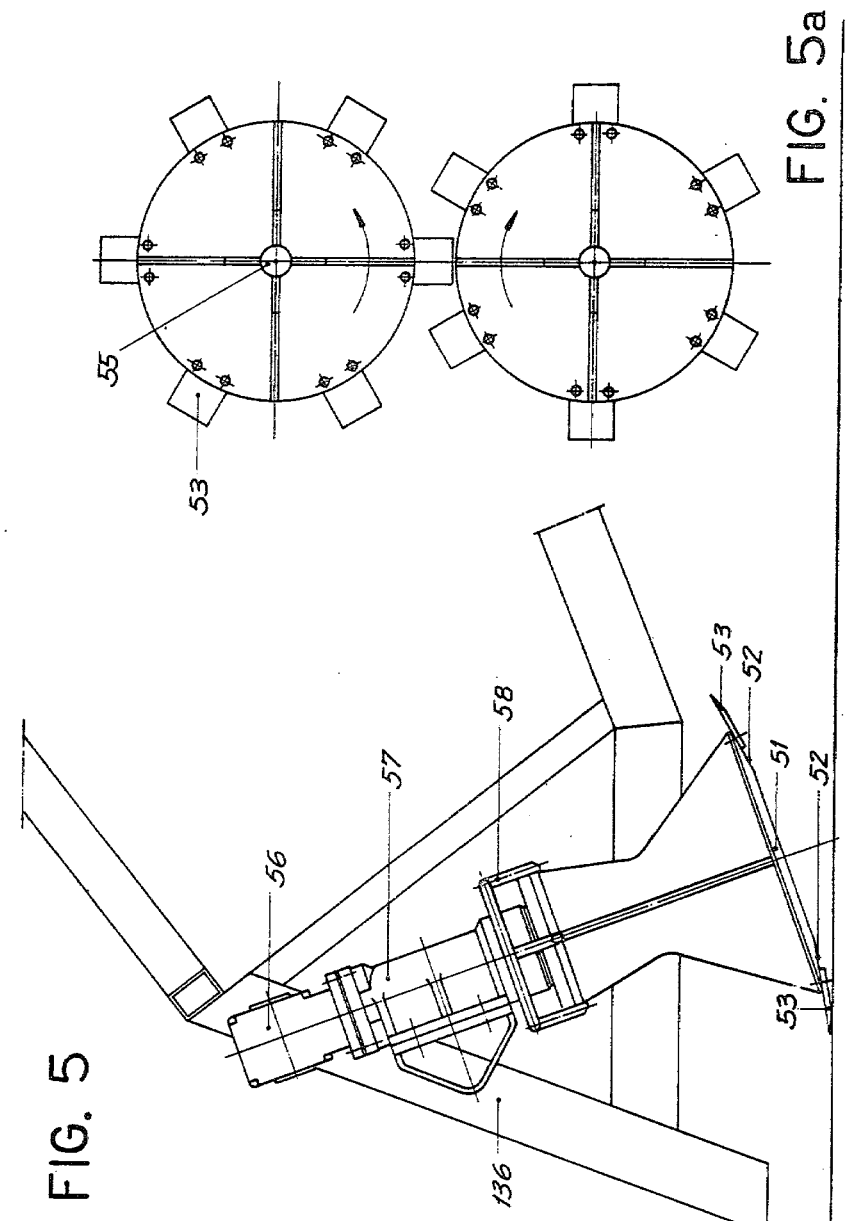

HARVESTER OF SUGAR CANE OR SIMILAR PRODUCTS

BACKGROUND OF THE INVENTION

The present invention concerns a sugar cane harvester, of the chopper type, entirely original in its conception and representing a true step forward in the present technology, for it presents features basically different from anything which has been developed to date in this field, with two extremely important advantages, viz.: (a) a significant reduction of moving parts (of the order of 50% of those utilized by the present technology) and (b) the cleaning of the harvested product (sugar cane with lower content of straw, leaves, earth, etc.) by means of more efficient trash separation (elimination) devices. These two features permit the manufacture of a simpler and more efficient harvester, with greater reliability for green cane (unburned) harvesting (without burning) which provides, with the same power and at a lower production cost than that now required by the present state of the art, a higher and safer production.

As a matter of fact, the introduction of this new conception in the field of sugar cane harvesting, is similar in many respects to the technological revolution caused by the introduction of the turbine-driven engines, which fully superseded conventional piston engines.

SUMMARY OF THE INVENTION

The basic concept which has allowed this technological improvement was the replacement of the independent chopping, cane elevating and trash separating mechanisms by a sole revolving mechanism consisting of one single shaft with a reversible rotation (on both sides) provided with displaceable knives and throwing vanes or wings, herein called the rotor and which simultaneously performs the three functions mentioned above, namely chopping, elevation and trash separation.

In order to enable the introduction of this new idea, an entirely new harvester which incorporates a series of improvements in many other of its constitutive systems and is the object of the present patent application.

The devices (or systems) of a chopper type cane harvester of the are the following:

1. Topper device.
2. Feeding device (the cane entrance into the harvester).
3. Base cutter device (ground level cane cut).
4. elevation and carrying (transport) devices.
5. Chopping device (the sugar cane is chopped into 20 to 30 cm. long billets).
6 Cleaning devices.
7. Elevation devices.
8. Storage and unloading devices.
9. Driving devices of the harvesting portions.
10. Harvester displacement devices.
11. Harvester driving devices.
12. Height adjustment and moving system positioning devices.
13. Power source.

In this new harvester, modifications and improvements, as well as new concepts have been introduced in the following systems above referred to: 1, 2, 3, 4, 5, 6, 7, 8 and 11. Conventional solutions, already utilized, have been used in the remaining systems: 9, 10, 12 and 13.

BRIEF DESCRIPTION OF THE DRAWINGS

For a fuller understanding of the invention, reference is had to the following description taken in connection with the accompanying drawings in which:

FIGS. 5 and 5a illustrate, respectively, (not to scale), a side view and a top view of the base cutter discs;

FIG. 7a shows, (not to scale), a front detail of the upper roller of the assembly of the preceding figure;

FIGS. 10 and 10a illustrate, respectively, (not to scale), a side view and a back view of the centrifugal-axial extractor utilized for cleaning purposes;

DESCRIPTION OF THE PREFERRED EMBODIMENTS

Referring more particularly to the drawings, the following description is taken in connection therewith:

1. Topper device

The harvester of the present invention is symmetrical, cutting one row of cane each time and the cane loading may be effected on either side of the machine according to the choice of the operator, and the conveniences of the field.

Therefore, the topper system should be symmetrical, allowing the cut-off tops to fall on the side where the loading is effected, thus avoiding the cut-off tops to fall on the row not yet harvested, and a subsequent reabsorption thereof by the harvester. In order to reach this effect (duality of the unloading sides) all conventional symmetrical harvesters employ at least two revolving mechanisms constituted of drums and/or chains provided with knives. A lways with the purpose of the simplifying the maintenance and reducing the number of moving parts, it has been developed for this harvester an extremely simple and ingenious system, which uses only one revolving drum driven by a sole hydraulic motor and a movable deflector, adjustable in two extreme positions through an hydraulic piston provided with only two fixed knives which effect a perfect cut of the sugar cane tops, which deflector directs its unloading to both sides of the machine depending only of its position coupled with the revolving direction on the hydraulic drum and the motor thereof.

Figure 1:
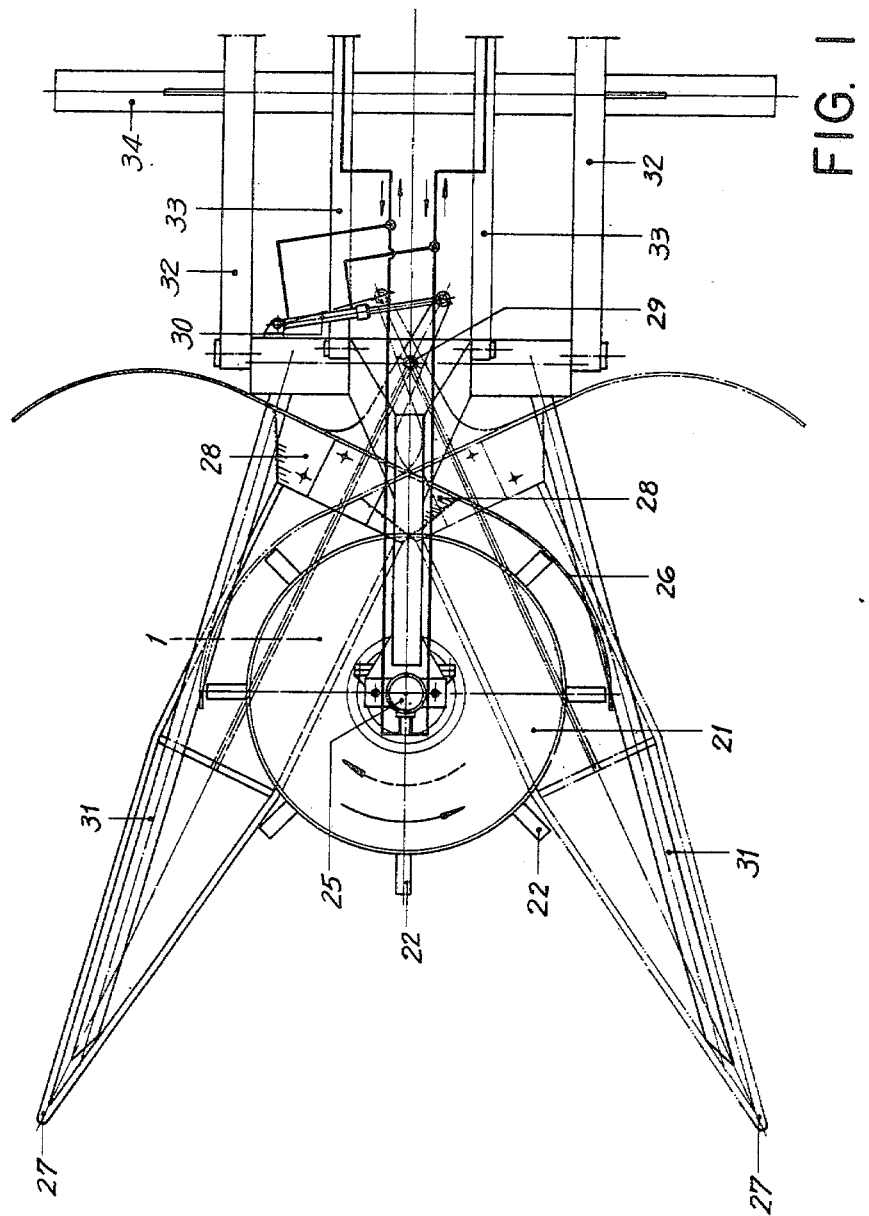
FIG. 1 is a top view (not to scale) of the topper device according to the invention.
Figure 2:
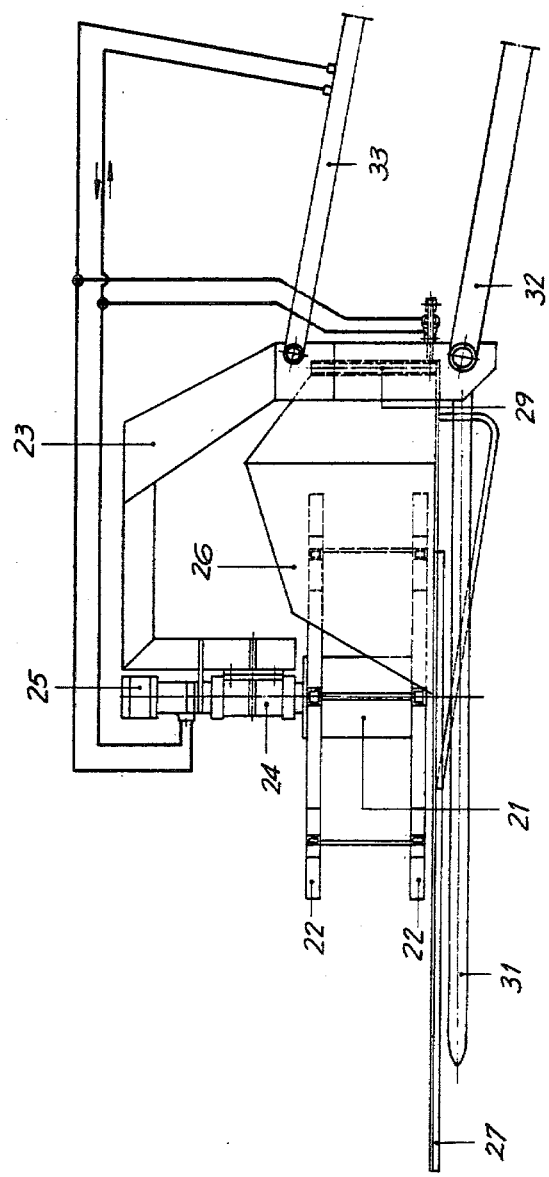
FIG. 2 is a side view of the topper device of FIG. 1.

Such system is illustrated in FIGS. 1 and 2, not to scale, where a radially winged drum 21 is shown with radial fingers 22 on its upper and lower portions. The drum 21 is supported by a frame 23 and rotates on the bearing 24 through the hydraulic motor 25. At the back of the topper, is the vertical deflector 26 which moves together with the horizontal deflectors 27 and the knives 28 around the vertical shaft 29. This movement is caused by the hydraulic piston 30, which operates parallely with the hydraulic motor 25. The frame 23 further has two divergent horizontal rods 31 which are fixed and open forwardly.

The topper's horizontal position is maintained by a parallelogram formed by the lower 32 and upper arms 33 which further lead the hydraulic oil to the motor 25 and the piston 30. The lower arms 32 have a most important peculiarity: transversely, at a predetermined point of their length, they have a support bar 34 which tumbles forward the cane sticks in order to facilitate the feeding of the machine.

Figure 14:
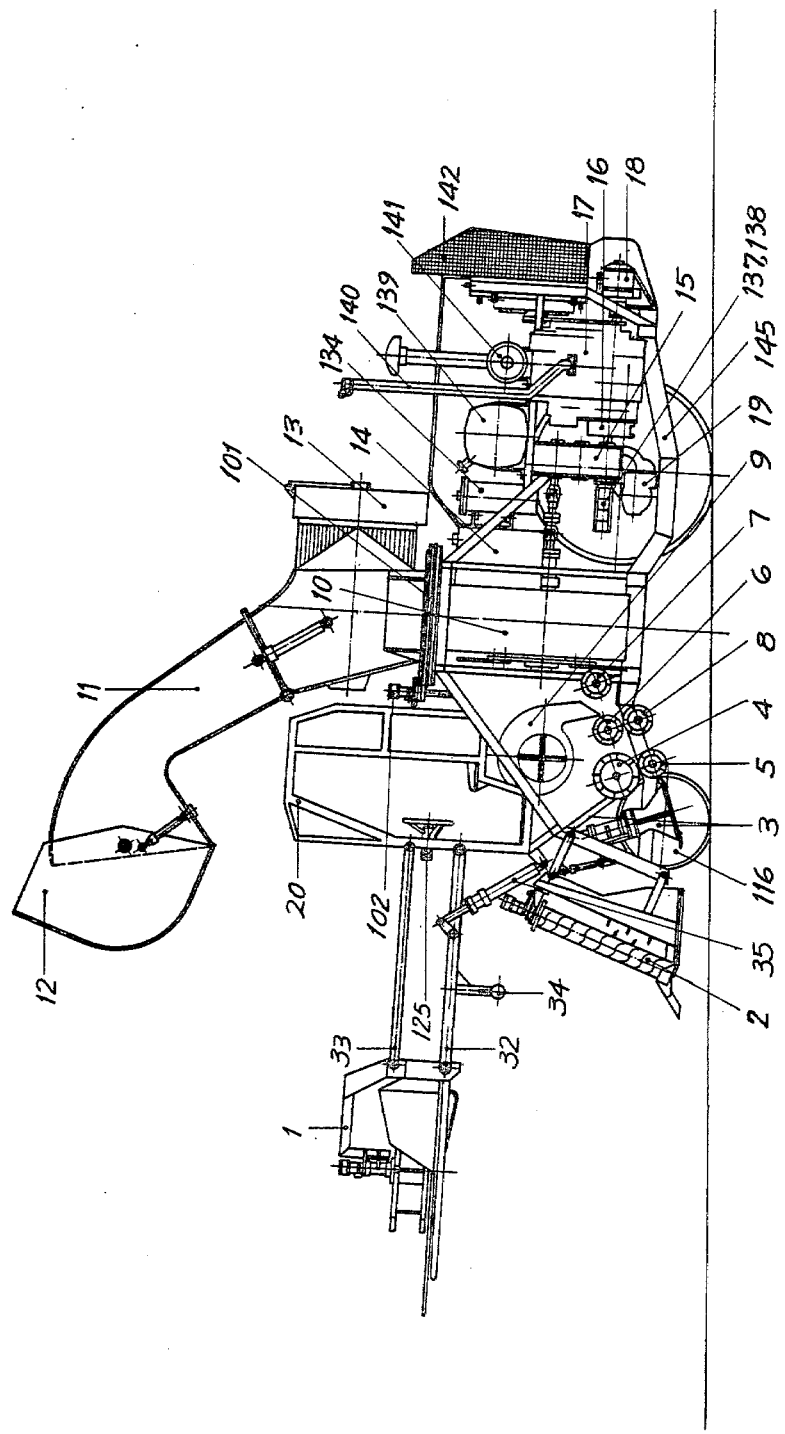
FIGS. 14, 15 and 16 illustrate, (not to scale), side, top and back views of a commercial embodiment of the new harvester according to the present invention.

The height adjustment of the topper is effected by the hydraulic piston 35 controlled from inside the cabin 20 (see FIG. 14).

In this system, the unloading of the cut off tops to both sides of the machine is made with the simple inversion of the hydraulic flow which feeds the driving motor 25 of the drum 21. Since the hydraulic piston 30 which positions the vertical 26 and the horizontal 27 deflectors is parallely connected with the hydraulic motor 25 itself, it automatically positions the deflectors 26 and 27 at the correct position, consistently with the rotational direction of the drum 21. This drum 21, provided with fingers 22 conveys the sugar cane which enters between the deflector 27 and the rods 31 to the space limited by the vertical deflector 26 and the drum 21 itself, forcing the tops against the fixed knives 28, thus cutting and throwing them to the free side of the harvester.

By reversing the rotation of the drum 21, the operating side is inverted and the cut off tops are thrown to the other side, as indicated by the dotted lines in FIG. 1.

2. Feeding Device

Figure 3:
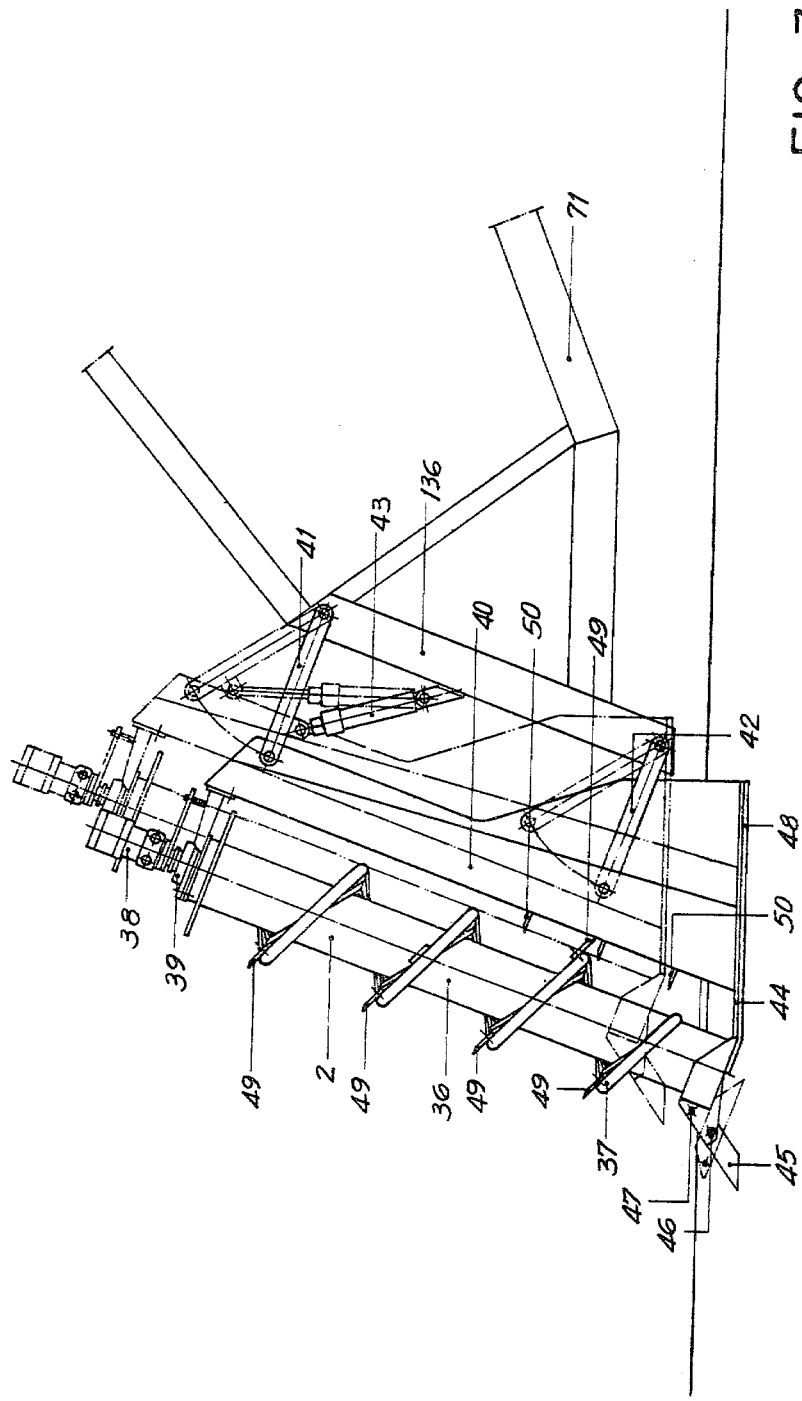
FIG. 3 illustrates, (not to scale), a side view of the feeding and elevation device of the fallen cane.

The feeding of the harvester's "throat" (the space where the sugar cane enters the base cutting mechanism) is illustrated in FIG. 3 and is performed by two inclined cylinders 36, provided with conventional helicoidal protrusions 37 attached to the floating frames 40 which rest on shoes 44 that slide on the ground and are hydraulically lifted by independent pistons 43. The highly effective novelty introduced here is the installation of knives 49 which are placed at intervals on the revolving helicoids 37, and of fixed counter-knives 50 (also in the form of sharp-edged knives) attached to the supporting framework 40.

This solution allows the harvesting of the raw or green (with unburned straw or leaves), sugar cane stopping the leaves from winding around the cylinders and clogging their movement. Any accumulation of straw around the cylinders is cut by the knives 49 and the fixed counter-knives 50, annulling the bushing.

In FIG. 3 are further illustrated the hydraulic motor 38 which drives the cylinders 36, a roller bearing 39, swinging arms 41 and 42 of the floating support 40, the tip 45 of the shoe 44, the shearing pins 46 and 47 which protect the tip 45, and the lower wear plate 48 of the shoe 44, which may be replaced.

3. Base Cutter Device

The base cutter device utilized is an advancement of the system previously developed by the applicant, which utilizes two independent discs provided with knives at their edges and with vanes or wings around their revolving shaft overlapping at their central cutting area, each of them being driven by a motor, provided with a hydraulic sensor which, in view of the pressure required by the cutting operation, drives the lifting system and raises the assembly when the pressure exceeds a limit predetermined by the operator (which generally occurs when the discs penetrate the ground).

Figure 4:
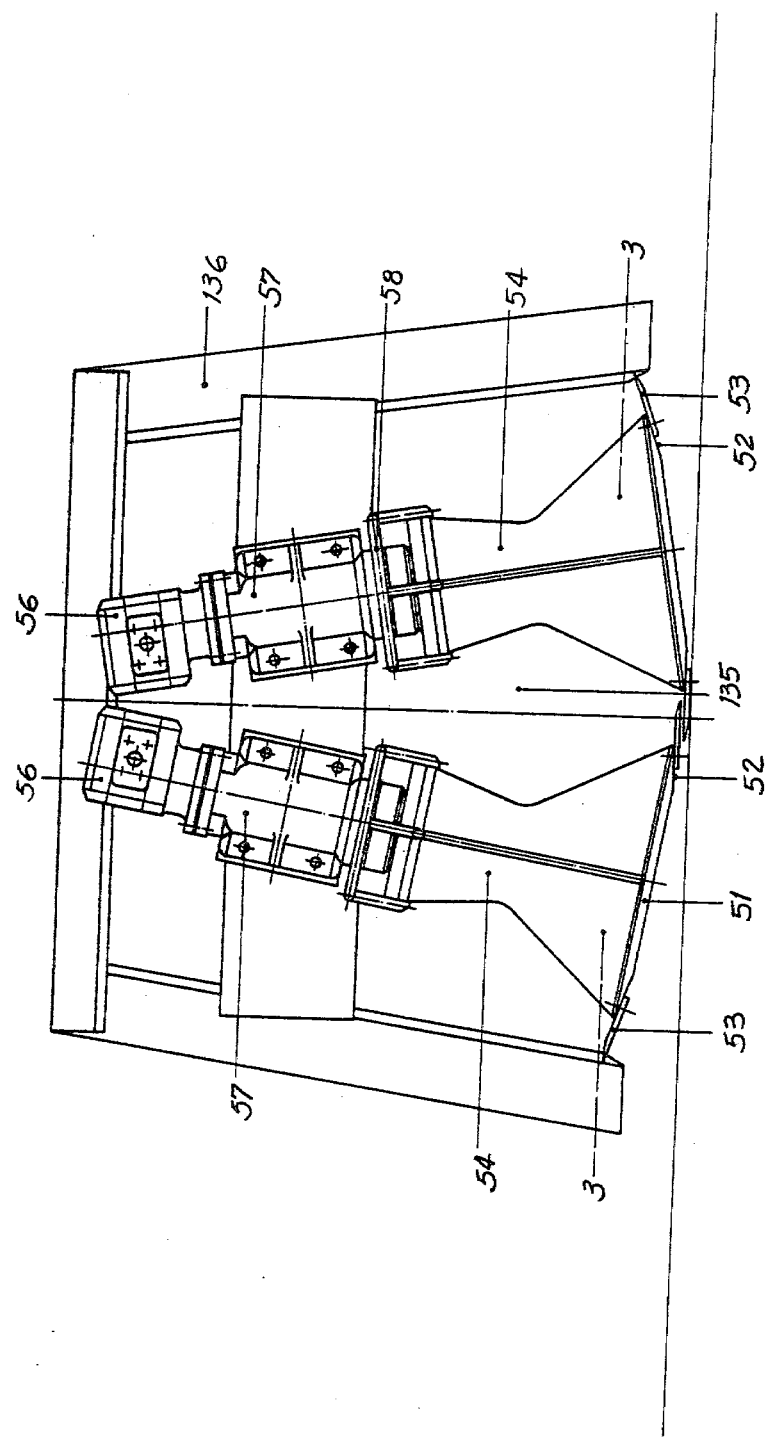
FIG. 4 illustrates, (not to scale), a front view of the base cutter device.

The improvement now introduced comprises the positioning of the revolving shafts of the discs, which were originally coplanar and parallel and contained in a forwardly inclined plane of the harvester, now also inclined inwards, with the shafts still coplanar but not parallel, overlapping at a point in the vertical symmetrical plane of the harvester and forming a sharp angle of approximately 15°. The advantage of this innovation is to allow a smaller contacting area with the ground which is also closer to the center of the system where the cane is located, enabling it to be cut closer to the ground with less power consumption. As illustrated in FIG. 4, the discs 51 are beveled or chamfered at their lower edge, so as to allow the installation of conventional plane knives 53, which are approximately parallel when in their overlapping area. Both sugar cane base cutters 3 are similar and symmetrical in relation to the vertical plane which passes through the center of the machine in the longitudinal direction thereof. The lower portion of the base cutter 3 is formed by a disc 51 which has bevelled edges 52, where plane cutting milled blades 53 are screwed or riveted. The cutting blades 53 of one disc overlap those of the other in the central position of the machine. The body of the cutter is formed by radial vanes or wings 54 which are attached to their moving shaft 55 driven by the hydraulic motor 56 through the supporting bearing 57 attached at the under structure 136. The higher portion of the cutter's body has fingers 58 which do not permit the straw to wind up in the section formed between the bearing and its body. It may be further seen in FIG. 4 that the shafts of the base cutters form an angle of approximately 15° in relation to the vertical symmetrical plane of the machine. FIG. 5 shows, without scale, a side view of the base cutters, evidencing the angle which they form towards the machine and also the angle of incidence of the cutting blades 53 on the ground.

4. Elevation/Carrying Device

Figures 6, 6A:
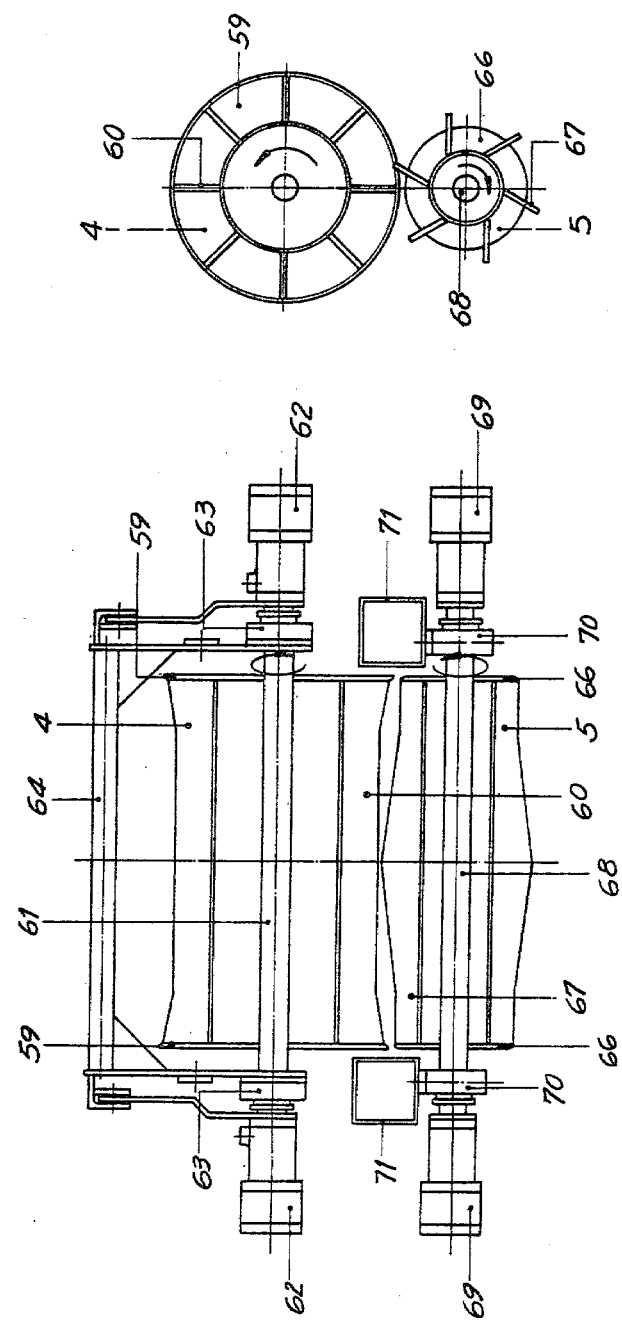
FIGS. 6 and 6a show, respectively, (not to scale), a front view and a side view of the first two rollers of the elevation/transport device.
Figure 7:
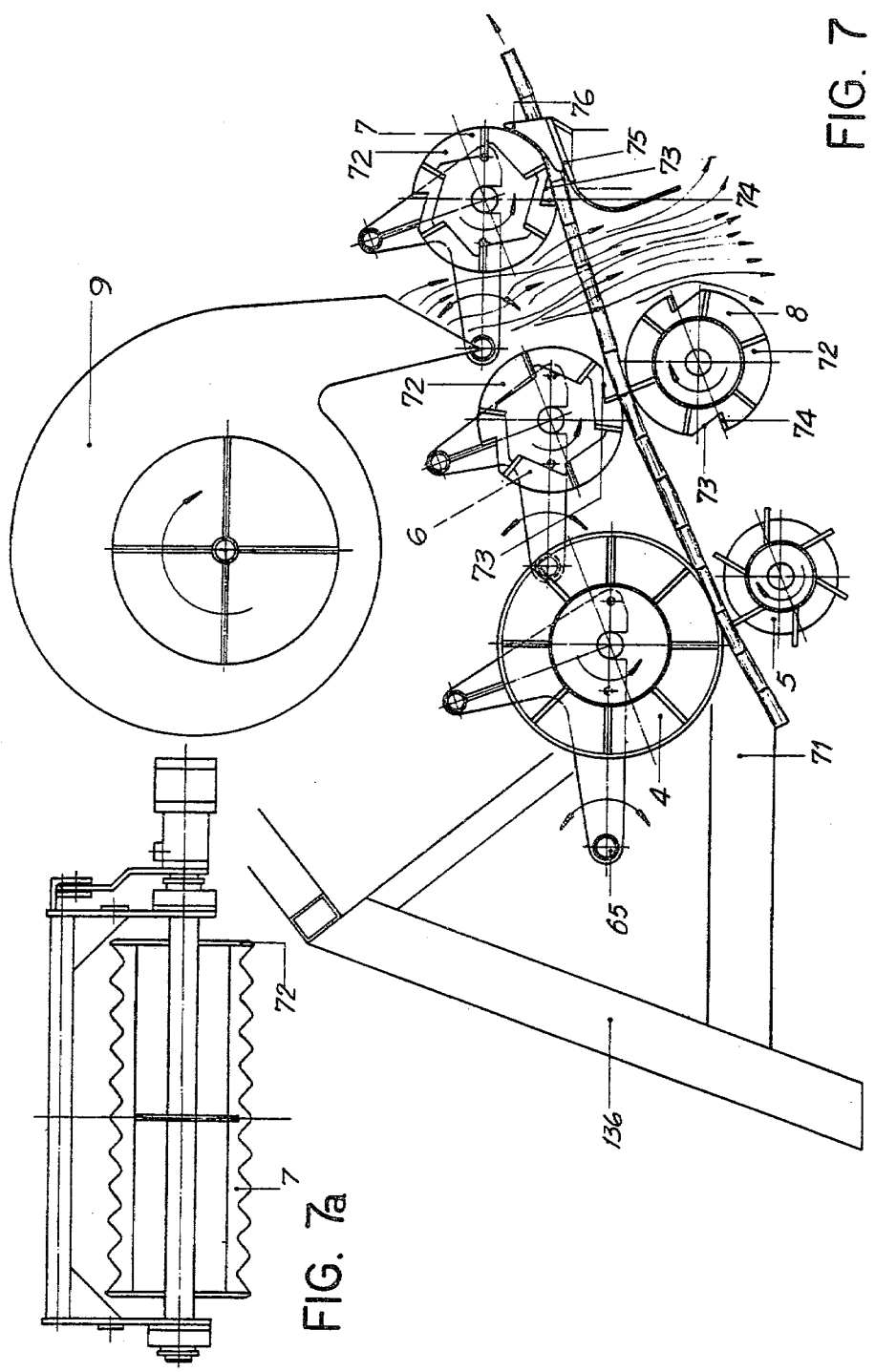
FIG. 7 shows, (not to scale), a side view of the elevation/transport assembly.

For the lifting and carrying of the still unbroken long stick sugar cane, from the base cutter discs up to the chopping device, a conventional set of five revolving rollers is utilized, the three higher ones being floating and the two lower ones being fixed, as illustrated in FIGS. 6 and 7. The improvements now introduced consist of the design of the vanes or wings (or grooves) of the first pair of rollers 4 and 5 which provide a better feeding and distribution the sugar cane to the next rollers 6 and 8 and of the introduction of a notch 73 at the outer edge of the flanges 72 of such rollers, which cuts through its sharp edge 74 any accumulation of unburned straws and leaves which may occur between the rollers and the outer flanges 72 of the system. This small notch is important for green cane harvesting, where a large amount of the green material is present. The upper roller 4 has side flanges 59 and vanes or wings 60, which are radial to the revolving shaft 61 thereof and is driven by hydraulic motors 62. The shaft 61 may revolve freely in the bearings 63 which are attached to one another by a support 64 which articulates in the pins 65 of the understructure 136. The lower rollers 5 of a smaller diameter than the upper one, has side flanges, 66, vanes 67 which are radial to its revolving shaft 68 and hydraulic motors 69 installed one at each side of the shaft 68 which may turn on the roller bearings 70 attached to the framework 71.

The pair of rollers 4 and 5, when in operation, homogeneously distribute the sugar cane on their revolving surface due to the design of the vanes 60 and 67. FIG. 7 shows, without scale, a side view of the elevating/carrying assembly formed by the two rollers already described and three additional ones, two upper rollers 6, 7 being movable and one lower roller 8 being fixed. The top rollers 6 and 7 have moving and assembling features similar to roller 4 and the lower roller 8 is similar to roller 5. The important innovation of these three rollers is that they have at their side flanges 72 notches in V form 73 with sharp edges 74 to cut the straw which might accumulate at that point. Under roller 7, there is the forward counter-cut 75 with triangular guides 76 which help the perfect chopping of the sugar cane. Rollers 6, 7 and 8 are driven by hydraulic motors coupled with their shafts. 5, 6 and 7—Chopping, elevating and cleaning devices.

The new conception of the rotor, which has already been discussed above, permits the replacement of the conventional chopping systems (through knives and/or revolving cylinders), elevation (through elevating conveyors constituted by metal chains and slats) and cleaning (by air jets approximately directed in a vertical direction from bottom to top through the already chopped sugar cane) by one sole revolving device constituted by one horizontal longitudinal shaft, provided with two knives and two vanes or wings equally spaced (90°) around the shaft or, alternatively, three knives and three vanes equally spaced (60°). In the present application, the latter case is illustrated (three knives and three vanes).

Figure 8:
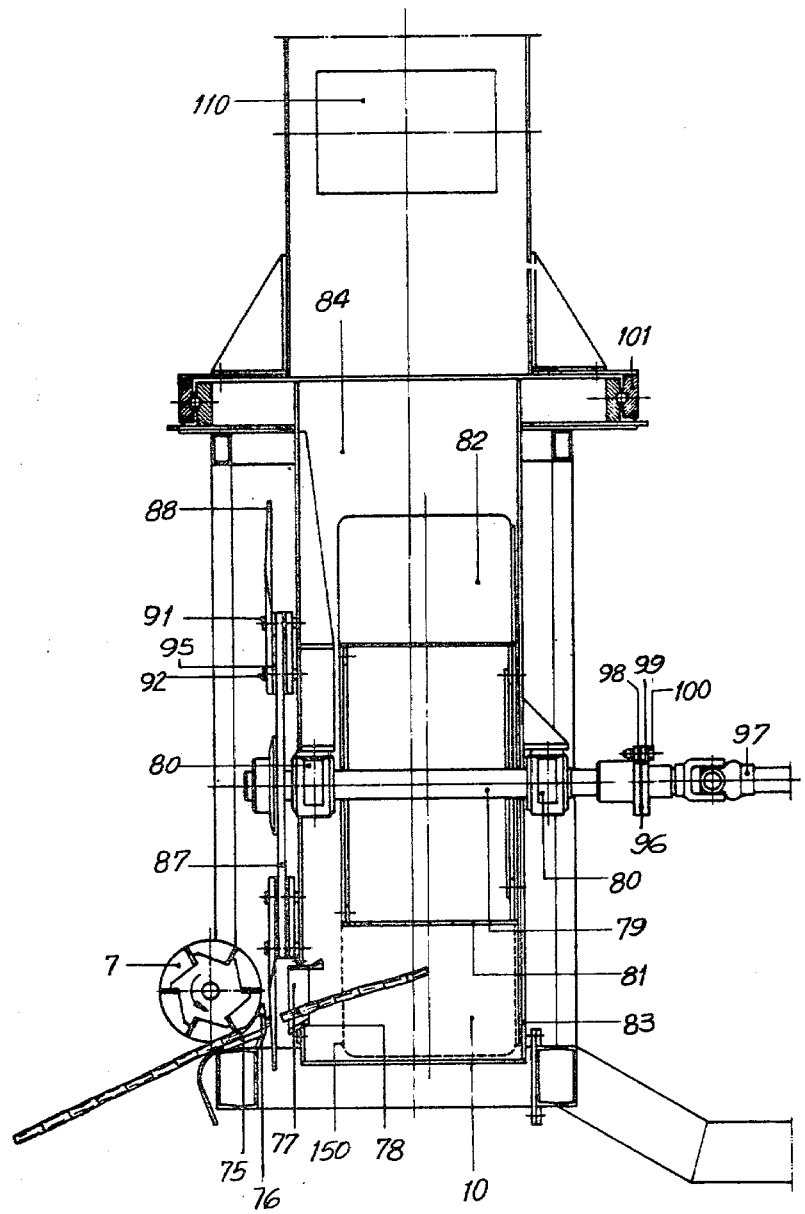
FIGS. 8 and 9 show, respectively, (not to scale), a side view and a front view of the lower portion of the chopping/elevation/cleaning assembly.
Figure 9:
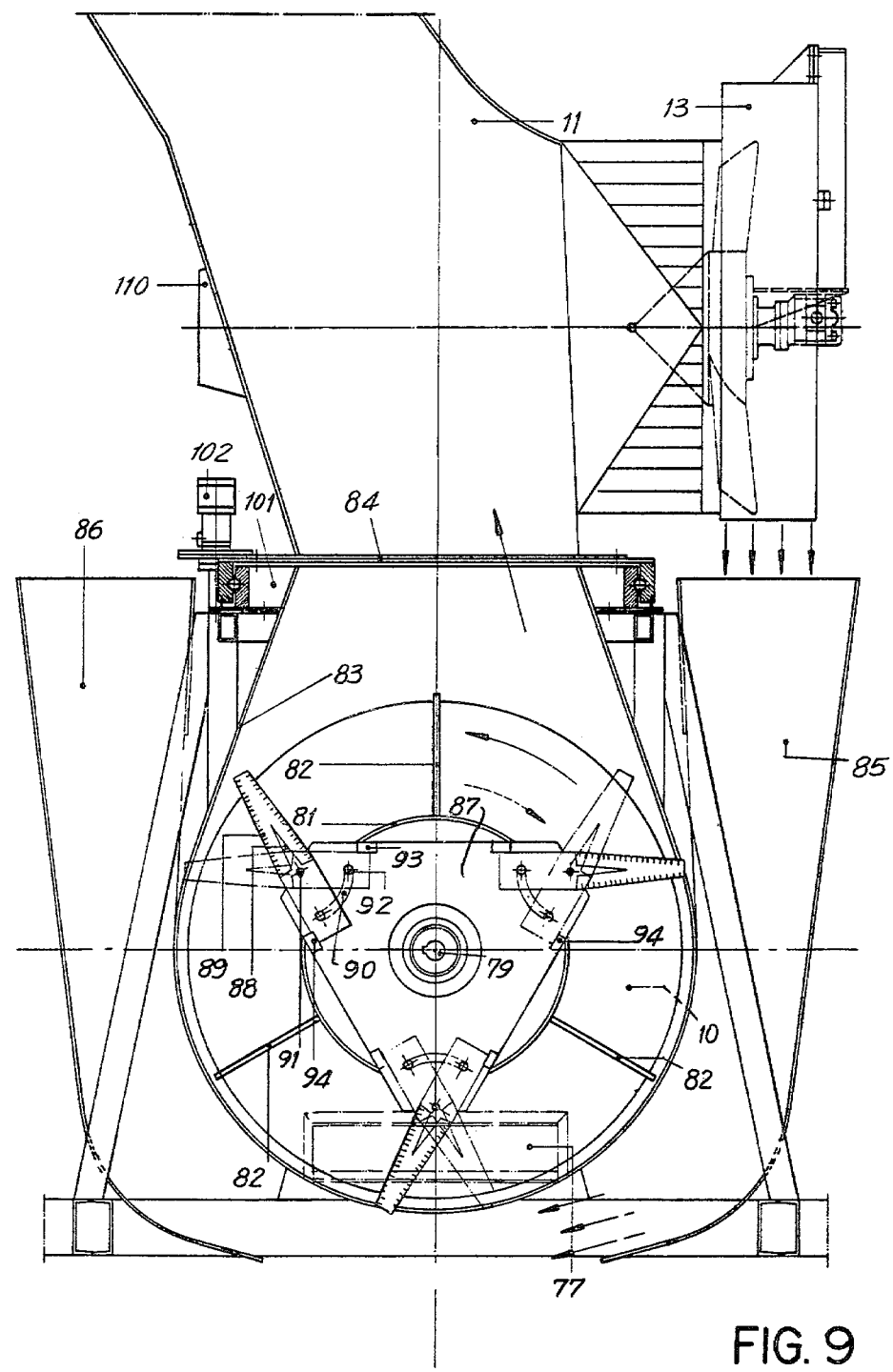
Figure 11:
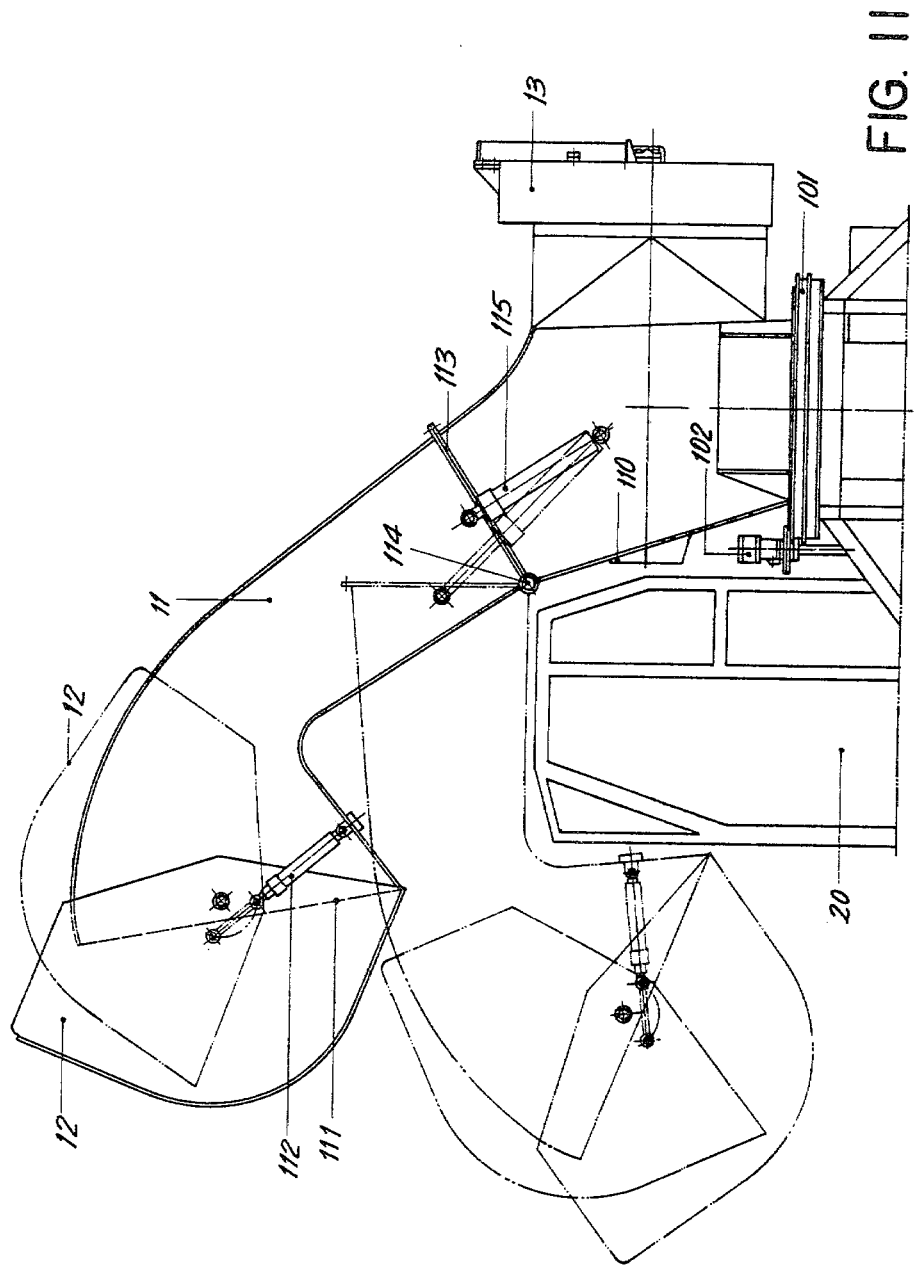
FIG. 11 illustrates, (not to scale), an upper view of the chopping/elevation/cleaning/ storing and unloading assembly.

The knives are replaceable and maintained at their furthermost position for each rotation by friction and rest on back stops, revolving in a plane perpendicular to the shaft, in front of and outside a throwing cylinder coaxial with the revolving shaft, inside of which the throwing vanes turn. This cylinder has an upper opening, which is symmetrical in relation to its longitudinal shaft, having at the top a directional movable duct. It further has an inlet at its front face under the revolving shaft and immediately after the knives' revolving plane. The throwing vanes, inside the cylinder, are maintained remote from the knives' revolving plane at an adequate distance, always greater than the space travelled by the sugar cane which is being fed during the time elapsed between the successive passage in the vertical plane of the cutting edge of one knife and of the next vane. The extraction of debris separated by the rotor is made by an axial-centrifugal extractor mounted on the directional duct, and cleaning is further facilitated by an additional centrifugal fan 9 which blows in the vertical direction, from top to bottom, through the mattress of unbroken sugar cane, when the latter passes between the second pair of feed rollers 6 and 8 and the fifth roller 7, withdrawing a large portion of loose earth and straw contained in the sugar cane before the latter is chopped. This fan 9 is illustrated in FIG. 7. This new system constitutes an improvement of the previous patents of the same applicant and is illustrated in FIGS. 8, 9 and 11. In them we can see, initially, the previous counter-cut 75, with its guides 76 and the fifth upper roller 7 mounted in front of the feeding inlet 77 of the cylinder 83, which has a back counter cut 78, a substantially horizontal longitudinal shaft 79 which revolves on roller bearings 8 and a concentric cylinder 81 which supports the three vanes or wings 82.

The bearings 80 are fixed to the outer cylinder 83, one inside and the other outside thereof.

Cylinder 83 terminates at the upper portion forming a central outlet 84 wherethrough are thrown the sugar cane billets which will follow to the directional duct 11. Sidewise and outside are mounted deflectors 85 and 86 which receive the dirt or trash extracted by the axial-centrifugal extractor 13. At the front end of the motor driving shaft 79 is attached the triangular flange 87 of the chopping mechanism, which has three mounted knives 88 with milled cutting edges 89 with a triangular profile, which may move inside the slots 90 through their fastening bolts 91 and 92. The displacement of the knives 88, according to the revolving direction of the topper is limited by the back stops 93 and 94. Between the knives and the flange, there are snap rings 95 which, through friction, maintain the knives in their working position, through fastening bolts 91.

At the back end of the driving shaft 79 is coupled a safety system 96 which receives the movements of the cardan 97. This system 96 is formed by flanges 98 and 99 and a shearing screw 100 joining them, which will be sheared in the event of excessive forces of the system. At the central upper outlet 84 of the cylinder 83 of the rotor 10, is mounted a directional duct 11 which, by means of bearing 101 of a large diameter, permits a turn through 180° of the duct 11 through the hydraulic motor 102 which operates a transmission chain conveniently attached to the outer side of the bearing 101. Placed at the lower part of the directional duct 11 the axial-centrifugal extractor 13 extracts the debris and dirt separated inside the duct 11 throwing them inside one of the deflectors 85 and 86.

These deflectors 85 and 86 direct the air flow with debris to under the machine and to the side of the cane row already cut.

Figure 10:
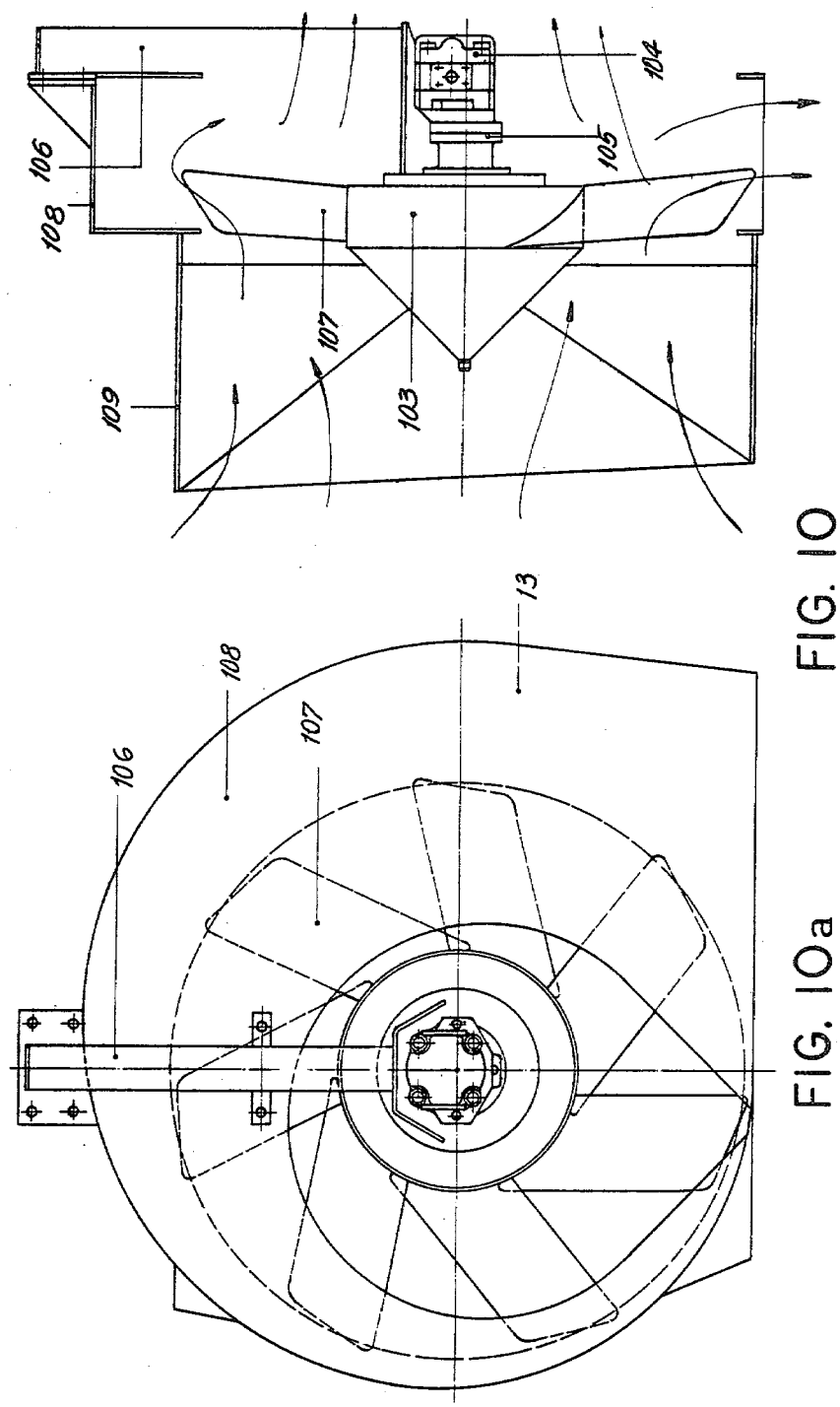

FIGS. 10 and 10a show, without scale, the axial-centrifugal extractor 13. It is composed of a central propeller 103 which has its driving shaft coupled to the hydraulic motor 104 through the bearing 105 which is fixed on the supporting arm 105. The properller blades 107 are equally spaced. The supporting arm 106 is attached to the spiral case 108 which in turn is coupled to the directional duct 11 through a cylindrical surface 109.

In the opposite part of the axial-centrifugal extractor 13 in the directional duct 11, there is an opening 110 which allows the suction of a transverse air flow. As already pointed out, the following solutions have preferably been adopted:

(a) Rotor: longitudinal, with sidewise throwing and rotation in two directions, selected by the operator;
(b) Knives: three, placed at 120°;
(c) Knife types: (present innovation)—triangular, displaceable in two positions, driven by the cane itself, according to the direction of rotation;
(d) Vanes: three fixed vanes or wings spaced at 120°;
(e) Cylinder: symmetrical, with central upper outlet;
(f) Duct: central, movable, turning 180° for left and right loading;

(g) Trash extractor: axial-centrifugal, mounted on the duct, with downward vertical trash discharge and a deflector to discharge the trash onto the ground under the harvester;

(h) Additional cleaning fan (9): axial-centrifugal, with descending vertical air jet, positioned before the chopping;

(i) Feeding inlet: provided with triangular vertical guide fingers.

the main improvements over applicant's previous patents include:

(1st) The centrifugal fan 9 illustrated in FIG. 7, which, located before the chopper and the feeding inlet 77 of cylinder 83 blows downwards onto the ground the major portion of loose earth and debris contained in the cane mattress, thus relieving the action of the rotor.

(2nd) The displaceable knives 88 illustrated in FIGS. 8 and 9 which, through their angulation ($\cong 30°$) and milled cutting edges 89, effect a neater and more efficient cut of the cane billets.

The displacement of the knives is obtained by their own movement through the cane mattress, which pushes the knives 88 in the opposite direction of the movement, until they rest on the back stops 93 and 94. The washers 95, formed of a resilient material of low friction coefficient, tightened by the fastening bolts 91 and 92 of the knives, keep them dislocated against their back stop 93 and 94 through friction power.

Each time the operator changes the direction of rotation of the rotor 10, in order to reverse the loading side, the knives 88 also revert their displacement.

(3rd) Feeding inlet guide fingers: illustrated in FIGS. 7 and 8 are the guide fingers 76 which are vertically projected upwards from the forward counter-cut 75, every one corresponding to each two protrusions of the fifth upper feed roller 7, so as not to affect the feeding of cane, due to their approximately triangular shape, and the formation of a back stop, or vertical counter cut, for the cane being cut by the knives 88 in their revolving movement. The introduction of these guide fingers 76, together with the angled knives 88 at approximately 30°, cause a perfect cut of the sugar cane billets, avoiding crushing and splintering of their extremities.

(4th) The utilization of an axial-centrifugal extractor 13, mounted on the directional duct, immediately after the upper throwing outlet 84 of the rotor 10. The extractor was developed specifically to extract and separate (through centrifugal power) with good aerogynamic performance, the solid trash suspended in the aspirated air, directing the discharged trash through its radial outlet, according to a convenient direction.

In this case, the extractor 13 aspirates the air which penetrates through the upper discharge opening 111 of the directional duct 11, and through an additional opening 110 made at the side opposite to the extractor 13 on the wall of the directional duct 11, so as to cause a movement of the air mass transversely and in countercurrent to the ascending movement of the cane billets and debris thrown by the rotor 10 inside the duct 11 completing the debris and dirt aerodynamic separation, thus making their extraction and directing their discharge vertically downwardly.

The system is completed by deflectors 85 and 86 in the shape of recurved chutes, which receive the air jet with the extracted debris and dirt and direct the latter to the ground under and to the opposite side of the harvester. In this way, an extraordinary cleaning of the harvested cane is obtained, enabling the operation of the harvester in green cane (without burning).

8. Storing and Unloading Devices

It is always necessary to store, for a short time (for instance, while the transport vehicle is being maneuvered), a certain amount of cane inside the simultaneous-loading harvesters, in order to avoid waste of time. It is also important to have available a discharge guiding mechanism to better distribute the load of the cane of the transport vehicle working beside the harvester.

In conventional harvesters, the storage is simply made by stopping the movement of the elevation conveyors, storing a certain quantity of cane on them and the discharge orientation on the transport is effected by a deflector, hydraulically driven, which directs the discharge of the sugar cane in a side postion on the transport vehicle.

In the present embodiment, as the movement of rotor 10 cannot be interrupted, a discharge outlet 12 has been developed, performing both functions above referred to, as illustrated in FIG. 11. FIG. 11 illustrates, initially, the axial-centrifugal extractor 13, the directional duct 11, the deflecting cap and store 12 as well as the upper discharge outlet 111. The deflecting cap and store 12 is driven by hydraulic pistons 112 mounted on each side thereof.

The duct 11 may articulate in the region 113, turning at the point 114 towards the front of the machine over the cabin 20 through the movement of the hydraulic pistons 115 controlled over by the operator inside cabin 20, in order to facilitate the travel of the harvester.

As may be noted, the deflecting cap 12 is hydraulically controlled driven by the pistons 112 controlled by the operator. When closed, a reasonable volume of sugar cane may be stored ($\cong 300$ Kg) in the cap. When open, according to its opening angle (in dotted line in FIG. 11), it serves to direct the discharge for a perfect distribution of the cane on the transportation vehicle.

9. Driving Devices of the Harvesting Portions.

For such driving operations, conventional solutions have been selected, with a view to always minimizing the number of moving parts. Thus, all drivings with the exception of the rotor, are made by adequate hydraulic motors, directly coupled to the driving shafts. The rotor is mechanically driven through an adequate reduction gear-box 15, with a reversible rotation and protected by a mechanical fuse 96 and friction 16 starting from the central diesel engine 17.

All important points of the diesel engine 17 are controlled inside the cabin 20.

10. Displacement Device of the Harvester

For the system the modern well known hydrostatic transmission has been utilized formed by a pump 18 and hydrostatic motors 19. Like the other controls, it is also controlled by the operator inside the cabin.

11. Driving Device

In conventional harvesters, the displacement of the driving wheels in the vertical plane is generally utilized as a means for adjusting the height of the base cutter discs and the entire front end of the harvester in relation to the ground. Thus, the support of the driving wheels must execute long vertical excursions in relation to the chassis or support of the harvester. On the other hand, it is very important to obtain the smallest turning radius possible, in order to facilitate the maneuvers at the end of the cane rows. It is also important to maintain the tread (distance between the wheels) quite reduced, the closest possible to the inter-center distances of the cane rows. Now, it is impossible to reconcile these three requisites with the conventional suspension/driving systems, through internal supports (usually triangular) between the driving wheels and the frame (a similar solution to that used in the front suspensions of the automobile industry), and with a vertical displacement controlled by a hydraulic piston.

Figure 12:
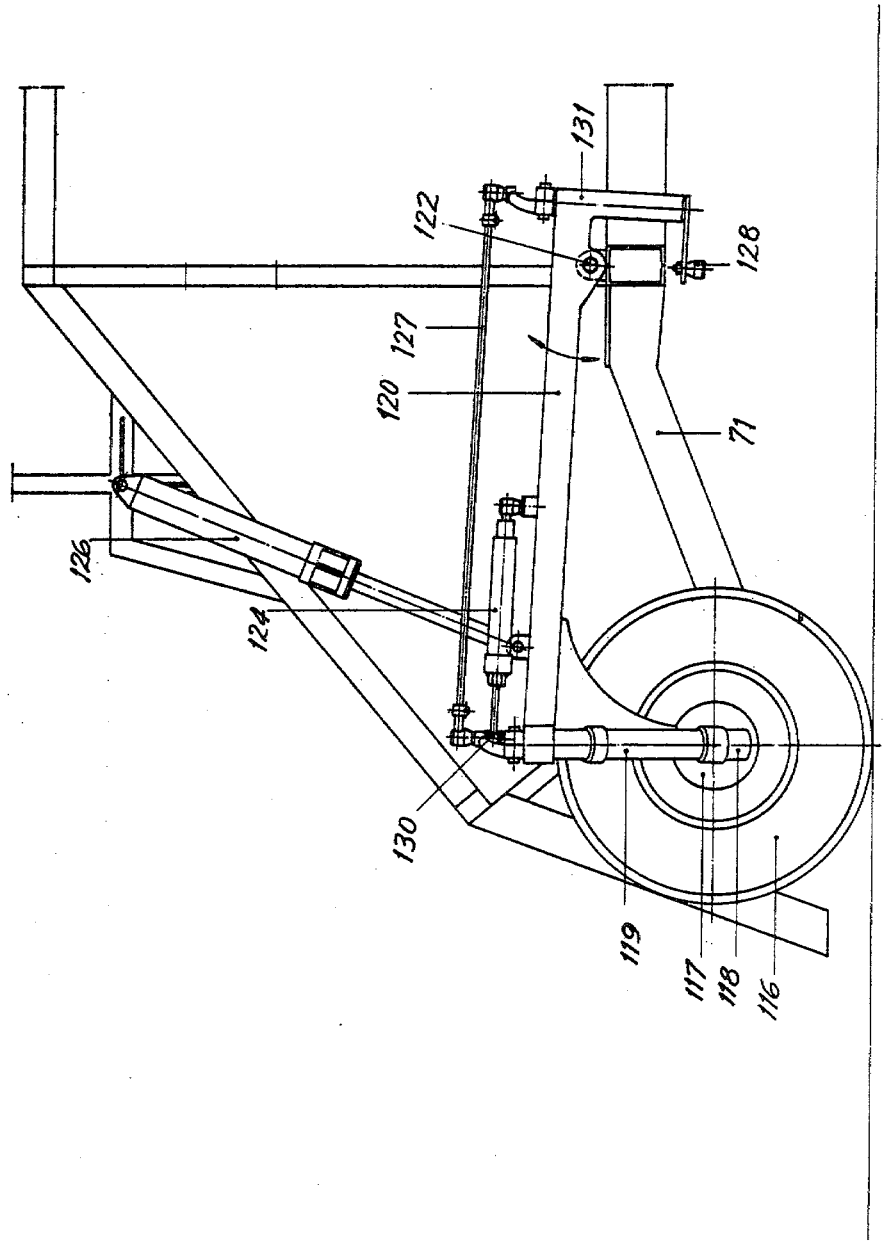
FIGS. 12 and 13 illustrate, (not to scale), the suspension and driving system of the harvester.
Figure 13:
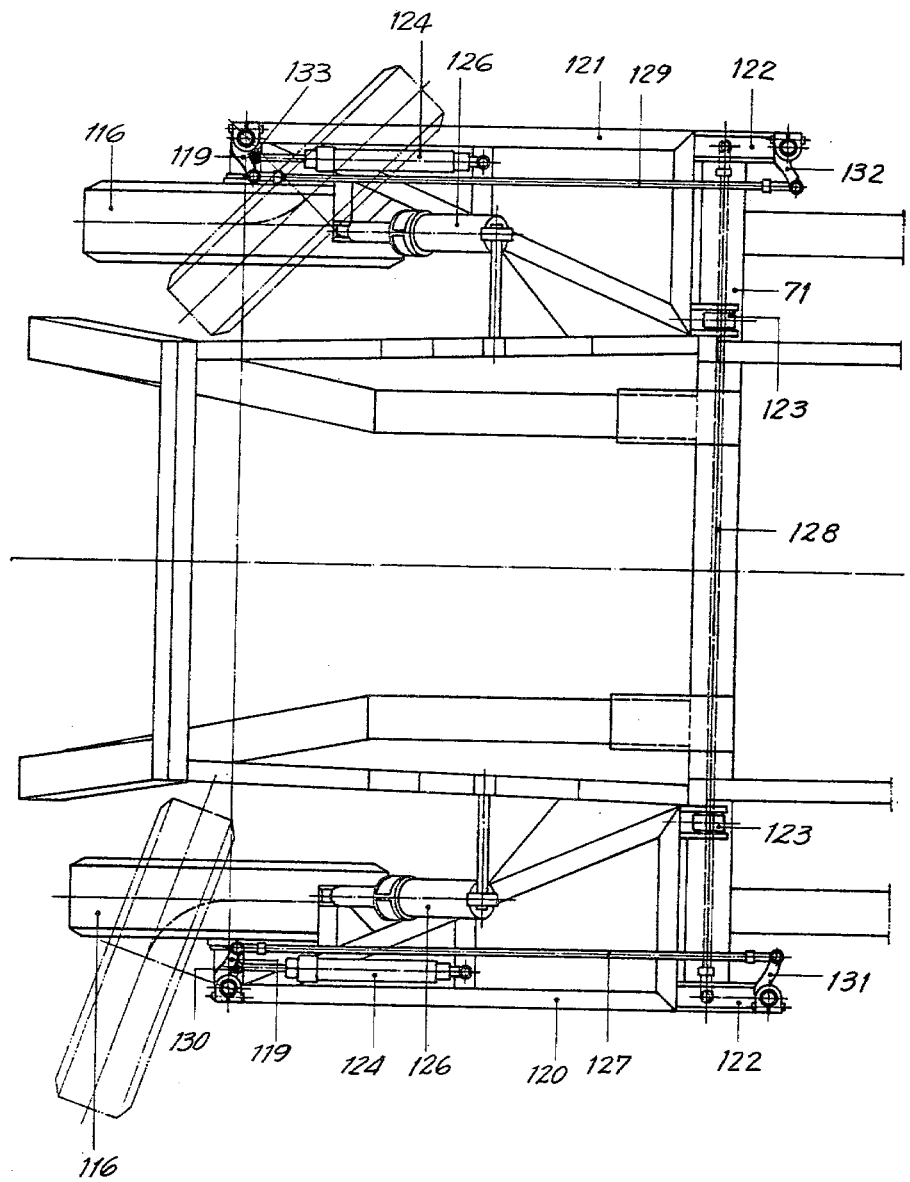

In order to solve this problem (using a conventional hydrostatic driving wheel), the suspension and driving system illustrated in FIG. 12 and 13 has been developed. In them, we see, respectively, without scale, a side view and a plan view of the steering mechanism, showing the front wheels 116 with their central hubs 117, supported on turning shafts 118 enclosed by steering knuckles 119 welded on the suspension arms 120 and 121. These arms 120 and 121, with a triangular structural shape, articulate on the bearings 122 and 123 on the main frame 71. The steering hydraulic pistons 124 driven by a hydrostatic mechanism 125 from inside the cabin 20 are coupled to the turning axle through the tie rod ends.

The ascending and descending movement of the suspension arms 120 is made by the lifting hydraulic pistons 126. The synchronization of the running of both wheels 116 is made by the mechanism formed by the steering rods 127, 128 and 129, which are conveniently interconnected and articulated by tie rod ends and bearings 130, 131, 132 and 133 and their length may be adjusted according to the running requirements. The innovations and advantages of this system are the following:

(1) The placement of the steering knuckles 119 outside the steering wheels 116. In this manner, when the wheels 116 turn, they are withdrawn a distance from the frame 71, thus allowing a reduced tread and a small turning radius.

(2) Longitudinal articulation arms: this performance allows the suspension arms 120 and 121 and the articulation to be calculated with great extension (long arms), thus minimizing the angular displacements required by large vertical excursions. It further allows mounting of the articulated connections 127, 128 and 129 between the wheels and the steering control hydraulic pistons 126, which are directly solidary to the suspension arms 120 and 121 in such a way that the vertical excursions of the suspension do not alter the geometry of the steering system, contrary to what happens in conventional solutions adopted by sugar cane harvesters, where the convergence of the steering wheels is strongly affected by the displacement thereof on the vertical plane.

12. Height Adjustment and Positioning of Moving System Devices

For these systems, a conventional solution has been adopted through adequate hydraulic pistons, controlled by the operator, by means of a central hydraulic system.

13. Power Source

Also conventionally, we have utilized as a primary power source, a diesel engine with sufficient power to meet eventual demand peaks.

This engine supplies power to:

(a) the hydrostatic transmission system, through an adequate pump 18;

(b) the various driving hydraulic systems, positioning, and steering through multiple hydraulic pumps 137 and 138;

(c) the rotor, mechanically, through adequate friction 17 and transmission case 15.

FIG. 14 shows a side view without scale of the harvester with the following components:

Topper 1
Inclined feed cylinders 2
Base cutter 3
Elevation carrying rollers 4, 5, 6, 7 and 8
Centrifugal fan 9
Rotor 10
Directional duct 11
Store 12
Axial-centrifugal extractor 13
Hydraulic oil tank 14
Gear reducing case 15
clutch 16
Diesel engine 17
Hydrostatic pump 18
Hydrostatic motors 19
Cabin 20
Topper supporting arms 32 and 33
Topper lifting piston 35
Turning bearing 101
Hydraulic motor 102 for the directional duct 11
Front steering wheels 116
Hydrostatic steering 125
Hydraulic oil filter 134
Hydraulic pumps 137 and 138
Fuel tank 139
Exhaust 140
Air filter 141
Radiator 142
Driving wheels 143
Driving wheel 143 reducers 144 (speed reducing gears)
Frame 145.

Figure 15:
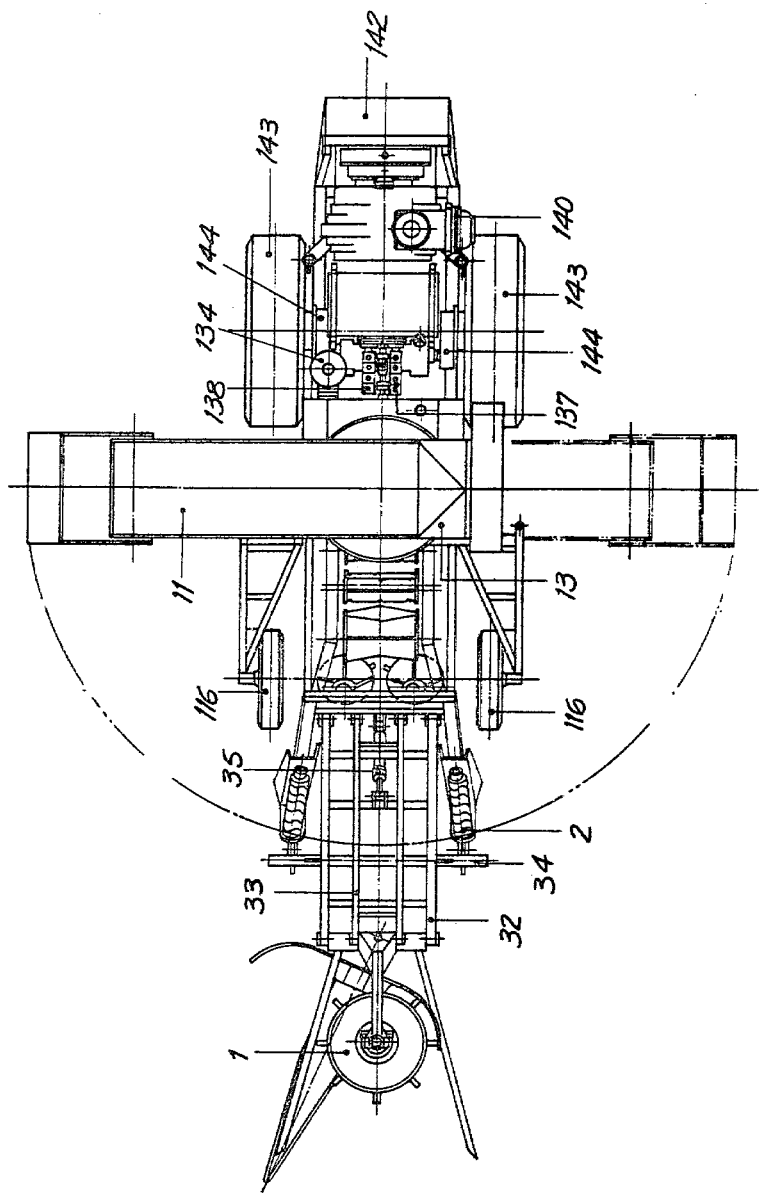

FIG. 15 shows, without scale, a plan view of the harvester with the same elements of FIG. 14 evidencing the 180° displacement of duct 11 to enable the harvesting in both cutting ways, in dotted line.

Figure 16:
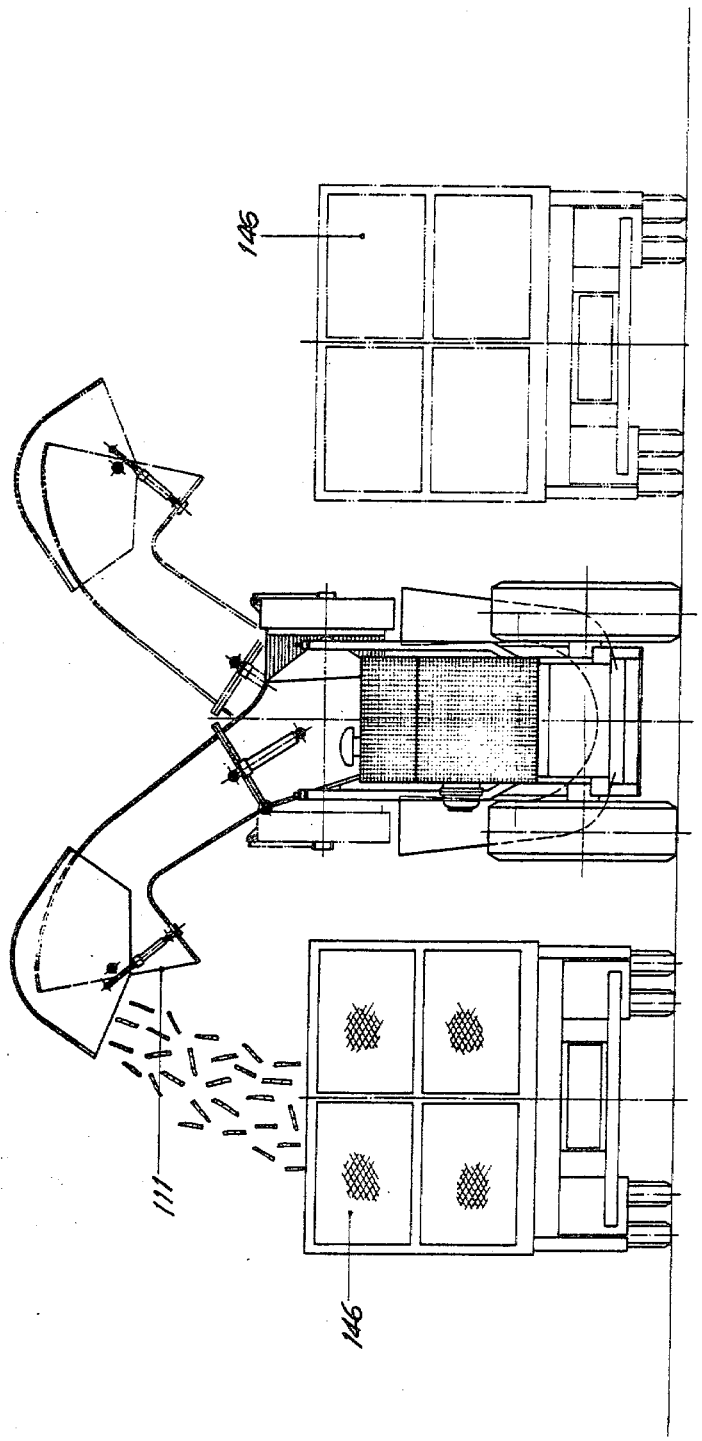

FIG. 16 shows, without scale, a back view of the cane harvester, in harvesting operation, having on its side and under the discharge opening 111 of duct 11 a conventional transport vehicle 146.

The same figure shows as well the possibility of unloading on both sides of the machine.

What is claimed is:

1. A harvester for sugar cane or the like comprising:
a frame;
suspension and steering means, including steering wheels, associated with the frame supporting the same for movement in a longitudinal direction;
rotary topping means mounted on said frame for cutting the cane tops;
feeding means mounted on said frame for feeding the cane in the longitudinal direction, said feeding means including inclined rotary cylinders having helicoidal protrusions formed thereon;
base cutter means mounted on said frame for cutting the cane bases, said base cutter means including a pair of rotary members, each being provided with knives along its periphery;
intermediate transport means mounted in said frame for transporting the cane including at least two cooperating rollers mounted for rotation about respective transversely extending axes;
chopping and elevating means mounted on said frame for chopping and then elevating the cane, said chopping and elevating means including a single shaft mounted for rotation about a substantially horizontal axis located in a vertical plane of substantial symmetry of the harvester and which extends in the longitudinal direction, at least one knife and an equal number of radially extending vanes mounted on said single shaft for rotation in respective planes transverse to said shaft axis of rotation, a substantially cylindrical member enclosing at least a portion of said single shaft having a cane inlet formed in a front wall thereof located below the axis of rotation of said single shaft and a cane outlet formed on an upper wall thereof, a directional duct member located over said cane outlet and mounted for rotation about a substantially vertical axis, said directional duct defining a substantially closed passageway which is inclined upwardly and towards a lateral side of the harvester;

cleaning means mounted on said frame proximate to said directional duct for extracting trash from the cane being cut; and means for driving said harvester and the components thereof including an engine, at least one hydraulic pump, drive transmission means and driving mechanisms.

2. The combination of claim 1 wherein said rotary topping means comprises a single rotary drum having outwardly extending fingers provided on the periphery thereof, motor means for reversibly rotating said drum in either one of two directions of rotation, a deflector member movable in a substantially horizontal plane between two positions; piston means connected to said motor means for moving said deflector member between said two positions, at least one fixed cutting knife, and a pair of forwardly diverging, substantially horizontal deflector members, whereby said deflector members direct the cane toward the rotating drum whereupon said fingers of said rotating drum cut the cane tops and direct the same towards one of the lateral sides of the harvester according to the selected direction of rotation of said drum.

3. The combination of claim 1 wherein said feeding means further include outwardly extending knives connected to said helicoidal protrusions formed on said rotary cylinders, and fixed knives attached to said frame in a manner such that the rotation of said cylinders causes said outwardly extending knives to cooperate with said fixed knives to break up any accumulation of cane leaves, straw and other debris on said rotary cylinders.

4. The combination of claim 1 wherein said pair of rotary members of said base cutter means include a pair of rotary discs having respective axes of rotation which converge upwardly towards each other to intersect each other at a sharp angle at a point on said longitudinally extending vertical plane of symmetry of the harvester, said axes being located in a plane which is inclined with respect to the vertical and towards the front end of the harvester, and wherein said rotary members further include vanes radially extending from respective ones of said axes of rotation for facilitating cane elevation and feeding between said discs.

5. The combination of claim 4 wherein said discs have lower surfaces whose peripheral edges are chamfered so as to have an inclination substantially equal to one half the sharp angle defined by said converging axes of rotation, and planar kinfe members removably attached to said peripheral edges of said discs, said knife members and discs being located such that said knives are parallel and overlap each other during rotation of said rotary members whereby said rotary members can be independently driven without being synchronized.

6. The combination of claim 1 wherein said chopping and elevating means further comprise a support flange fixed to said single shaft having said axis of rotation, means for reversibly rotating said shaft in one of two directions about said axis of rotation, each of said at least one knives being pivotally mounted on said support flange by means of a first bolt-type member, and a second bolt-type member being fixed to each knife which extends into a respective arcuate slot formed in said flange member having a center of curvature which coincides with said first bolt-type member, each of said slots being formed such that a respective knife can pivot about the first bolt-type member about 30° to each of its radial position, and back stop members fixed to said flange for limiting the pivotal movement of respective knives, and plate members interposed between each of said knives and said flanges.

7. The combination of claim 6 wherein each of said at least one knife has a substantially triangular shape having cutting edges formed on two sides thereof and having a width which decreases in the outward direction and being symmetrically formed with respect to said longitudinal axis.

8. The combination of claim 6 wherein the plane in which said knives rotate is located outside of said substantially cylindrical member and wherein said cane inlet is located rearwardly of said plane of rotation of said knives in a position so as to be receivable of the cane transported by rearward ones of said rollers of said intermediate transport means and wherein said radially extending vanes mounted on said single shaft are located within said substantially cylindrical member, and wherein the vertical plane containing the front edges of said vanes is spaced from the vertical plane containing said knives a distance which is greater than the distance travelled by the cane during the time elapsed between the successive passage into corresponding aligned positions of a cutting edge of a knife and the next following vane.

9. The combination of claim 8 wherein said substantially cylindrical member includes an upper portion located above a cylindrical portion and having a truncated conical configuration, whereby said chopped cane is thrown upwardly by said vanes through said upper portion and into said directional duct, said directional duct being capable of rotating through an angle of about 180° to both sides of the harvester.

10. The combination of claim 9 wherein said directional duct terminates at an upper portion in a curved surface defining an outlet and which determines the path of the chopped cane and further including a deflector member pivotally mounted to said upper portion of said directional duct about a transverse, substantially horizontal shaft to modify the direction in which the chopped cane is discharged, and wherein said deflector member is pivotable to a position wherein it closes the outlet of said directional duct in order to provide a storage area for the chopped cane.

11. The combination of claim 1 wherein said cleaning means comprises a centrifugal axis extractor mounted on said directional duct and proximate to said substantially cylindrical member and communicating with the interior thereof and a pair of static deflector members located on respective lateral sides of the harvester, each defining a passageway for directing debris under the harvester, whereby said centrifugal axial extractor extracts air with entrained debris, straw and other trash from said directional duct and directs the same downwardly through one of said static deflector members in counter-current relationship to the ascending path of chopped cane in said directional duct.

12. The combination of claim 1 further including means for adjusting the cutting height of said pair of rotary members comprising said base cutter means, said height adjusting means comprising means for varying the vertical position of said frame with respect to said steering wheels.

13. The combination of claim 12 wherein said means for varying the vertical position comprises longitudinal arms supporting a steering wheel axle, said arms being articulated to the rear end of said frame, and piston means interconnecting said longitudinal arms and said frame, said steering wheels being located outside of said frame and said arms being located outside of said steering wheels, and wherein said steering wheels are located proximate to said base cutter means.

* * * * *